United States Patent [19]

Arsac et al.

[11] 4,042,579

[45] Aug. 16, 1977

[54] LIQUID DISAZO DYESTUFFS DERIVED FROM DIPHENYLSULPHIDE

[75] Inventors: Aimé Joseph Arsac, Condrieu; Pierre Frank, Saint Clair du Rhone, both of France

[73] Assignee: Produits Chimiques Ugine Kuhlmann, Paris, France

[21] Appl. No.: 585,545

[22] Filed: June 10, 1975

[30] Foreign Application Priority Data

June 28, 1974  France ................. 74.22596

[51] Int. Cl.² .............. C09B 35/24; C09B 35/22; D06P 1/08
[52] U.S. Cl. .............................. 260/178; 8/4; 8/6; 8/26; 44/59; 106/22; 208/12; 260/184; 260/186
[58] Field of Search ........... 260/174, 176, 178, 177, 260/182, 184, 186; 44/59

[56] References Cited

U.S. PATENT DOCUMENTS

| | | | |
|---|---|---|---|
| 2,087,597 | 7/1937 | Gatzeit | 44/59 |
| 2,850,493 | 9/1958 | Seruto | 260/182 |
| 3,690,809 | 9/1972 | Orelup | 8/6 |

OTHER PUBLICATIONS

Beilstein, Handbuch der Organischen Chemie, vol. 16, p. 379 (1933).

Primary Examiner—Floyd D. Higel
Attorney, Agent, or Firm—Beveridge, DeGrandi

[57] ABSTRACT

Liquid dyestuffs of the general formula:

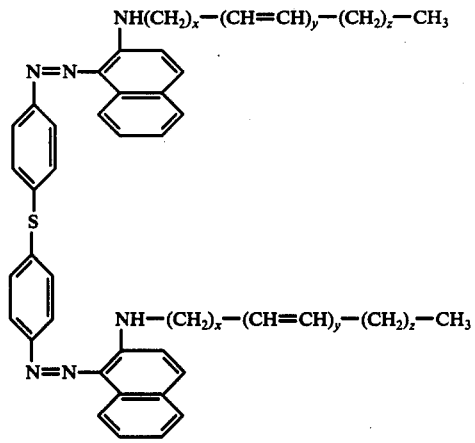

in which $y$ represents 0 or 1, $x$ and $z$ each represent a whole number in which the sum $x + y + z$ is a whole number from 5 to 17; a process for the preparation of such dyestuffs in which the bis-diazo derivative of bis-(4-amino-phenyl)-sulphide is coupled in aqueous medium with a 2-N-alkylamino-naphthalene of the formula:

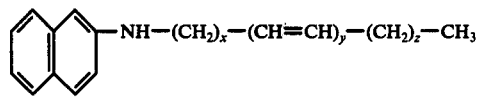

$x$, $y$ and $z$ having the same significance as above, in the proportion of two molecules of naphthalene derivative to one molecule of bis-diazo derivative; and the use of these dyestuffs for the coloration of petroleum products, inks, fats, waxes and plastics materials.

9 Claims, No Drawings

LIQUID DISAZO DYESTUFFS DERIVED FROM DIPHENYLSULPHIDE

The present invention relates to new liquid water-insoluble disazo dyestuffs derived from diphenylsulphide which are miscible in all proportions with aliphatic or aromatic organic solvents; to their preparation and to their use in the colouration of petroleum products, inks, fats, waxes or plastics materials, which they colour in scarlet shades.

According to the present invention azo dyestuffs are provided having the following general formula:

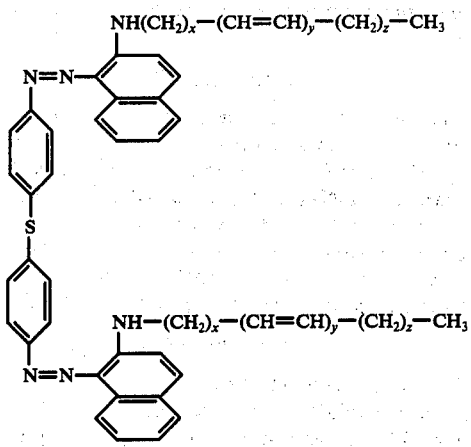

in which $y$ represents 0 or 1, and $x$ and $z$ each represent a whole number in which the sum of $x + y + z$ is a whole number from 5 to 17.

The invention includes mixtures of such dyestuffs as well as mixtures of the dyestuffs with aliphatic or aromatic hydrocarbons. These mixtures advantageously comprise at least 40 parts of dyestuff to 60 parts of hydrocarbon, preferably 80 parts of dyestuff to 20 parts of hydrocarbon.

The dyestuffs of formula (I) may be prepared for example by coupling in aqueous medium the bis-diazo derivative of bis-(4-amino-phenyl)-sulphide with at least one 2-N-alkylamino-naphthalene of the general formula:

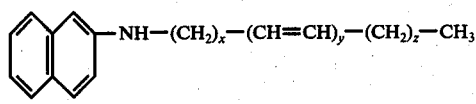

$x$, $y$ and $z$ having the same significance as above, in the proportion of two molecules of naphthalene derivative to one molecule of bis-diazo derivative.

The coupling is advantageously effected in aqueous medium at a pH of 2 to 13, preferably at a pH of 2 to 7, at a temperature from 0° to 25° C. The 2-N-alkylamino-naphthalene or the mixture of N-alkyl-2-amino-naphthalenes may be dispersed in water before being added to the bis-diazo derivative. It can also be dissolved in a certain amount of a solvent immiscible with water. The amount of solvent is preferably chosen so as to obtain a mixture which does not contain more solvent than the proportion desired. The mixture of solvent and dyestuff is separated from the aqueous phase by decantation. Mixtures at the selected concentration are thus directly obtained without it being necessary to prepare the dyestuffs separately, isolate them, dry them and mix them with the desired solvent. During the coupling process the pH is maintained constant by means of a mineral alkaline substance such as for example custic soda, or an organic substance such as for example pyridine, or by means of a basic salt such as sodium or potassium carbonate or bicarbonate or sodium acetate.

The dyestuffs according to the invention are in the form of fluid liquids at ordinary room temperature. They are miscible in all proportions with aromatic or aliphatic hydrocarbons such as for example benzene, toluene, ortho-, meta- and para-xylene, or cumene, and with petrol for motor engines, fuels, as well as with alcohols, ketones and esters.

For the colouration of the petroleum products, mixtures according to the invention comprising from 10% to 60% of hydrocarbon, preferably 20%, are particularly advantageous. In fact, these mixtures are very fluid, their viscosity being not much greater than that of the hydrocarbon itself, even at temperatures of the order of $-20°$ C. It is therefore possible to carry out a continuous dissolution by injection into the hydrocarbons to be coloured whatever their temperature may be, the displacement of the liquids causing a sufficient agitation to give instantaneously complete dissolution. It is however possible to use the dyestuff directly if the turbulence is sufficient.

Numerous dyestuffs which are soluble in organic solvents are already known. They are available in the form of powders which are relatively sparingly soluble in solvents, their solubility seldom exceeding 5%. Their use therefore requires the handling of large volumes of solvents. In addition, the handling of the powders is dirty and causes pollution.

Dyestuffs having a considerable solubility in hydrocarbons are known, but their manipulation is difficult, since they are generally in the form of "tars" or "tarry solids" which are not directly utilisable. Thus French Pat. No. 2,039,344 describes dyestuffs obtained by coupling the diazo derivative of a benzene primary amine with the N,N'-polyethylated derivative of a benzene diamine. In addition, not only are the products obtained "thick tarry substances" but it is necessary to dry this substance, then to dissolve it in the prescribed solvent and finally to filter the solution obtained, which involves a certain number of operations.

U.S. Pat. No. 3,494,714 describes mixtures of disazo dyestuffs of which the melting point is of the order of 30° C. The preparation of concentrated solutions necessitates heating for "several hours" of 40 parts of dyestuff, 35 parts of nonylphenol and 25 parts of xylene. 40% solutions of dyestuffs are thus obtained.

U.S. Pat. No. 3,690,809 desribes the dyestuffs obtained by coupling the diazo derivative of an aromatic primary amine or an amino-azo dyestuff with a heptyl β-naphthol or with 4-nonyl-1-hydroxy-benzene. The dyestuff obtained is a soft tar which it is advisable to dry before it is dissolved in the xylene.

British Pat. No. 1,142,239 described 3-methyl-N,N-4'-diethylamino-azobenzene which enables a 35% solution to be obtained in a mixture of orthoxylene and benzene, the dyestuff being prepared and dried before it is dissolved.

German Patent Application No. 2,129,590 relates to dyestuffs prepared by condensation of non-liquid azo dyestuffs with isobutoxy- ethylene. The reaction is carried out in a very dilute solution in toluene and necessitates the intermediate preparation of a dyestuff which must be dried. The final solution is not very concentrated.

German Patent Application No. 2,111,370 relates to dyestuffs whose solubility does not exceed 50%.

Compared with the dyestuffs of the above-mentioned prior art, those of the invention have numerous advantages. Since they are in liquid form, the operations of filtration, drying and grinding, which are necessary in the case of the dyestuffs whose melting point is greater than 50° C., are not necessary. As they are not tars, their separation from the reaction medium is effected by simple decantation. Finally, when solutions in any solvent are required, it is unnecessary previously to isolate the dyestuff, dry it and dissolve it. Mixtures preferably comprising 80 parts of dyestuff and 20 parts of solvent are obtained directly. These mixtures consist of liquids which are extremely fluid at all temperatures and have a concentration superior to that of the solutions described in the above mentioned prior art. These mixtures may consist of a starting mixture for the production of more dilute solutions, as for example, in the colouration of petroleum products.

The following Examples illustrate the invention, and the parts given are parts by weight unless the contrary is indicated.

EXAMPLE 1

21.6 parts of bis-(4-amino-phenyl)-sulphide are diazotised in the usual way. 45.4 parts of 2-N-hexylamino-naphthalene dispersed in 100 parts of water at 90° C. are added to the solution of the bis-diazo derivative. A little sodium carbonate is added to bring the pH to 3.5 and the reaction is allowed to proceed at 5° C. until all the bis-diazo compound has reacted. Then 45.4 parts of xylene are introduced and the mixture is heated to 70° C., the aqueous layer is decanted and the concentration of the dyestuff is adjusted to 50% by the addition of xylene to the mixture obtained. A solution is obtained which colours hydrocarbons in a scarlet shade.

If instead of dispersing the 2-N-hexylamino-1-naphthalene in water it is dissolved in 45.4 parts of xylene, the same solution of bis [(2-N-hexylamino-1-naphthyl)-4-azo-phenyl] sulphide is obtained.

The sodium carbonate can also be replaced by potassium carbonate, sodium bicarbonate, sodium acetate or pyridine.

The following Table gives Examples of other bis-[(2-N- alkyl-amino-1-naphthyl)-4-azo-phenyl] sulphides obtained on coupling the bis diazo derivative obtained from 21.6 parts of bis-(4-amino-phenyl) sulphide with the following amounts of 2-N-alkylamino-naphthalene in solution in an equal quantity of xylene. All these dyestuffs colour hydrocarbons, inks, waxes and plastics materials in scarlet shades.

| Example | 2-N-alkylamino-naphthalene | Amount used |
|---|---|---|
| 2 | 2-N-octylamino-naphthalene | 51 parts |
| 3 | 2-N-decylamino-naphthalene | 56.6 parts |
| 4 | 2-N-dodecylamino-naphthalene | 62.2 parts |
| 5 | 2-N-tetradecylamino-naphthalene | 67.8 parts |
| 6 | 2-N-hexadecylamino-naphthalene | 73.4 parts |
| 7 | 2-N-octadecylamino-naphthalene | 79 parts |
| 8 | N-(9-octadecene-yl)-2-amino-naphthalene | 78.6 parts |

EXAMPLE 9

A solution comprising 3.4 parts of 2-N-octylamino-naphthalene, 21.8 parts of 2-N-decylamino-naphthalene, 345 parts of 2-N-dodecylamino-naphthalene, 120.2 parts of 2-N-tetradecylamino-naphthalene, 71.4 parts of 2-N-hexadecylamino-naphthalene and 99.2 parts of 2-N-octadecylamino-naphthalene in 198.2 parts of xylene is added to a solution of the bis-diazo derivative obtained from 216 parts of bis-(4-amino-phenyl)-sulphide. The pH is taken to 4 by means of a little sodium carbonate. When the coupling is finished, the organic layer which consists of a liquid mixture comprising more than 80% of dyestuff ($\lambda = 522$ nm) is separated. It colours hydrocarbons, inks, waxes and plastics materials in a scarlet shade.

EXAMPLE 10.

If the preceding Example the mixture of 2-N-alkylamino- naphthalenes is replaced by a mixture comprising 11.4 parts of 2-N-dodecylamino-naphthalene, 19,4 parts of 2-N-tetradecyl-amino-naphthalene, 76.8 parts of 2-N-hexadecylamino-naphthalene, 72.4 parts of 2-N-octadecylamino-naphthalene and 598 parts of N-(9-octadecene-yl)-2-amino-naphthalene, a dyestuff of similar shade and properties ($\lambda = 526$ nm) is obtained.

EXAMPLE 11

If in the preceding Example the mixture of 2-N-alkylamino- naphthalenes is dispersed in 1000 parts of water at 50° C. instead of dissolving it in xylene, the same dyestuff but without any solvent is obtained.

We claim:
1. Liquid dyestuff of the formula:

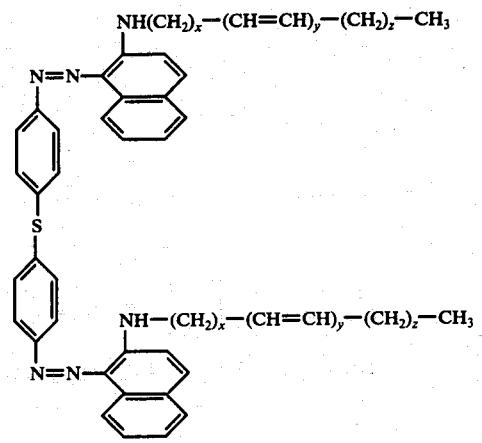

in which $y$ represents 0 or 1, $x$ and $z$ each represent a whole number in which the sum $x + y + z$ is a whole number from 5 to 17.

2. A dyestuff as claimed in claim 1 in which $y = z = 0$ and $x = 5$.

3. A dyestuff as claimed in claim 1 in which $y = z = 0$ and $x = 7$.

4. A dyestuff as claimed in claim 1 in which $y = z = 0$ and $x = 9$.

5. A dyestuff as claimed in claim 1 in which $y = z = 0$ and $x = 11$.

6. A dyestuff as claimed in claim 1 in which $y = z = 0$ and $x = 13$.

7. A dyestuff as claimed in claim 1 in which $y = z = 0$ and $x = 15$.

8. A dyestuff as claimed in claim 1 in which $y = z = 0$ and $x = 17$.
9. A liquid dyestuff of the formula:
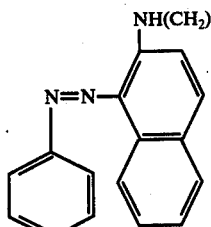
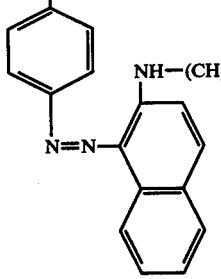
in which $x$ is 8, $y$ is 1 and $z$ is 7.
* * * * *